Patented Aug. 10, 1954

2,686,167

UNITED STATES PATENT OFFICE 2,686,167

STABILIZATION OF SYNTHETIC RUBBERS WITH A SULFITE AND AN ANTIMONYL COMPOUND

Harry E. Albert, Akron, Ohio, assignor to The Firestone Tire & Rubber Company, Akron, Ohio, a corporation of Ohio No Drawing. Application September 10, 1952, Serial No. 308,917

12 Claims. (Cl. 260—29.7)

This invention relates to the stabilization of latices of rubber-like copolymers, such as GR-S and the like. Stabilization with antimonyl catecholates and the like has been suggested, but these compounds cause a darkening of the latex which increases on standing. They likewise tend to precoagulate the latex. Such compounds are water insoluble and are used as dispersions. Their amine-alcohol complexes are water soluble and by their use the disadvantages of water insolubility are overcome. Likewise, the tendency to precoagulate is lessened. There is little or no lessening of the discoloration of the latex.

According to this invention a sulfite is used with such stabilizers. It retards or prevents discoloration, and when used with the antimonyl catecholates, themselves, retards or prevents precoagulation. Only certain sulfites, more particularly defined in what follows, have this beneficial effect.

The latex to which this invention relates is the aqueous latex of a rubber-like copolymer of a conjugated hydrocarbon diene monomer and an ethylenically unsaturated monomer. Such diene monomers include, for example, butadiene-1,3, isoprene, 2-cyanobutadiene, cyclopentadiene, piperylene, dimethylbutadiene, 2-methylpentadiene-1,3, etc. The other monomer may, for example, be any of the following, or a mixture thereof:

Styrene
Alpha methyl styrene
Nuclearly substituted styrenes
Monochlorostyrene
Dichlorostyrene
Vinylnaphthylamine
Vinylbiphenyl
Vinyl carbazole
2-vinyl-5-ethyl pyridine
2-ethyl-5-vinyl pyridine
Acrylonitrile
Esters of acrylic acid, and particularly the methyl, ethyl, propyl and butyl esters
Vinyl ketones, including the methyl, ethyl, propyl, butyl and amyl ketones
Vinylacetamide
Acrylic acid
Methacrylic acid, etc.

The stabilizer comprises two components, namely an antimonyl compound and a sulfide. The antimonyl compound is, for example, antimonyl catecholate, antimonyl pyrogallolate, antimonyl 4-tert.-butyl catecholate, antimonyl-4-tert.-amyl catecholate, antimonyl-4-phenyl catecholate, antimonyl-4-isopropyl catecholate, antimonyl-4-methylcatecholate, antimonyl-4-chloro catecholate, antimonyl-4,6-dimethyl catecholate, antimonyl-4-tert.-octyl catecholate, antimonyl-4-bromo catecholate, antimonyl-4,6-di-tert.-butyl catecholate, antimonyl-4-tert.-butyl-6-methyl catecholate, antimonyl-1,2-dihydroxy naphthalene, etc., or an amine complex of any of the foregoing antimonyl compounds, or an amine-alcohol complex of any of the foregoing antimonyl compounds. The amine-alcohol complexes may be prepared as disclosed by Wheeler and Banks in Journal of American Chemical Society, volume 70 (1948), page 1264. Those complexes which are described specifically in that paper may be used in carrying out the invention, and are incorporated herein by reference as a part of this disclosure.

The alcohols which are used in making the complexes are water soluble and include, for example, methanol, ethanol, the propanols, ethylene glycol, propylene glycol, glycerol, sorbitol, mannitol, dextrose, galactose, levulose, etc. The amines which are used in preparing the complexes are at least partially water soluble and include, for example, ammonia, diethylamine, triethylamine, piperidine, ethylamine, methylamine, dimethylamine, trimethylamine, isopropylamine, diisopropylamine, n-butylamine, di-n-propylamine, furfurylamine, ethylene diamine, piperazine, etc.

The amine and alcohol need not be used in equimolecular amounts in preparing the complex. Substantially more or less than one molecular equivalent of the amine is used for each molecular equivalent of the alcohol. Each complex contains substantially one equivalent of amine per mole of the antimonyl compound utilized in preparing the complex; thus one atom of nitrogen from an amine is present in the complex for each atom of antimony. The amine-alcohol complex contains additionally one to two equivalents of a water soluble alcohol per mole of the antimonyl compound. The structures of the complexes have not been established.

Thus, in stabilizing a latex according to this invention, one employs with a small amount of sulfite, a small amount, e. g. 0.5 to 5.0 per cent by weight based on the weight of the copolymer, of an antimonyl compound of the class consisting of (A) an antimonyl 1,2-dihydroxy phenolate of the class consisting of (1) phenolates and naphtholates which are unsubstituted, (2) phenolates and naphtholates which contain in the 4-position a substituent of the class consisting of alkyl, aryl and halogen substituents, and (3) catecholates which are 4,6-di-substituted with substituents from the class consisting of the alkyl, aryl and halogen substituents, said alkyl and aryl substituents each containing no more than eight carbon atoms, or (B) an amine-alcohol complex of one or more of the foregoing antimonyl compounds, or (C) an amine complex of one or more of the foregoing antimonyl compounds.

The sulfite used to prevent discoloration is an ammonium sulfite, an alkali metal sulfite such as sodium sulfite, or potassium sulfite, etc., or an alkaline earth metal sulfite such as calcium sulfite, stronthium sulfite, or barium sulfite. Only a small amount of the sulfite is used, e. g. 0.5 to 5.0 per cent by weight based on the weight of the copolymer, and this may be more or less than the amount of the antimonyl compound used. The alkaline earth metal sulfites are not to be used with a latex which contains soap, because the alkaline earth metal will precipitate the soap, taking it out of solution and rendering it ineffective so far as the prevention of discoloration is concerned.

The following illustrate the production of the complexes:

Preparation of ammonia complex of antimonyl catecholate

A solution of 50 ml. of concentrated ammonia in 500 ml. of water was heated to 80° C. Fifty grams of antimonyl catecholate was added and the resulting slurry was filtered. Cooling of the filtrate gave 12.5 grams of a light brown solid, very soluble in water. The brown product decomposes before melting.

Preparation of ammonia-alcohol complex of antimonyl tert-butyl catecholate

A solution prepared by mixing 100 ml. of ethyl alcohol, 50 ml. of concentrated ammonia and 500 ml. of water was heated to about 70 to 80° C. Sixty grams of antimonyl tert-butyl catecholate was added, and after the reaction mixture had been heated at 80 to 85° C. for one hour it was filtered. On cooling the filtrate gave 10.5 grams of a yellow precipitate. This complex was sparingly soluble in water. It contained one mole of ammonia to the residue of a mole of tert-butyl catechol, and the residue of one to two moles of ethyl alcohol. The complex chars and decomposes as it melts.

Preparation of ammonia-alcohol complex of antimonyl catecholate

A solution prepared by mixing 100 ml. of ethyl alcohol, 100 ml. of concentrated ammonia, and 500 ml. of water was heated to about 70 to 80° C. Antimonyl catecholate (115.3 grams) was then added, and after the reaction mixture had been heated at 70 to 80° C. for an hour the undissolved solid was filtered off. Cooling in an ice bath precipitated a cream-colored solid which was filtered off. This complex contains equimolecular proportions of the ammonia and the catecholate nucleus, and the residue of one to two moles of the ethyl alcohol. It is very soluble in water. On heating it decomposes before melting.

In what follows, the effect of the sodium sulfite is illustrated by comparative data obtained at room temperature. The advantage of using an antimonyl catecholate, etc. or its complex is first illustrated by reference to data obtained in a test in which the effects of aging were accelerated by heating. Two per cent of the complex of antimonyl catecholate prepared according to the last paragraph was used in latex of uninhibited copolymer of butadiene and styrene (GR–S), and its effect was determined by comparison with a sample of the same latex containing no stabilizer. Both latices were coagulated in an identical manner with low-iron aluminum sulfate. The coagula were dried in a forced-circulation oven for twenty hours at 75° C. and then tested in a forced-circulation oven at the temperature indicated in the following table, for the indicated time. The table shows change in color and indications of deterioration.

| Stabilizer | Aged One Day at 110° C. | Aged Four Days at 90° C. |
|---|---|---|
| Complex | Gray; no change | Gray; no change. |
| Blank | Light brown; cured | Light gray brown; slightly set up and slightly resinous in spots. |

Under the first test conditions, although the stabilized latex coagulum showed no change in its physical condition, the blank lost its plasticity as though it had been cured. In the second test, the blank passed beyond this stage, and even became resinous in spots.

The effect of the addition of sulfite on discoloration is relatively rapidly apparent and is shown by tests conducted at room temperature:

Effect of sulfite

The ammonia-alcohol complex of antimonyl catecholate was added to GR–S latex (i. e. latex produced by aqueous emulsion copolymerization of about 70 parts butadiene and 30 parts styrene) in different small amounts, and the latex was aged for one day and also 32 days at room temperature. Sodium sulfite was added to one of these samples of latex before aging. For comparison, a well known commercial stabilizer was added to a sample of the same latex which contained no complex. These were compared with another sample of the same latex to which no stabilizer was added and which is referred to herein as a blank. A record was made of the color of each sample after each againg period. The results are recorded in Table I.

TABLE I

| Stabilizer | Aging at Room Temperature | |
|---|---|---|
| | One day | 32 days |
| 0.5% ammonia-alconol complex of antimonyl catecholate | Light blue-gray | blue-gray. |
| 1.0% ammonia-alcohol complex of antimonyl catecholate | do | Do. |
| 1.5% ammonia-alcohol complex of antimonyl catecholate | do | Do. |
| 1.5% ammonia-alcohol complex of antimonyl catecholate plus 1.5% sodium sulfite | white | white. |
| 1.5% well known antioxidant for GR-S | off white | very light brown. |
| Blank | white | slightly yellow. |

The above table shows that the blue-gray discoloration caused by the amine-alcohol complexes of antimonyl catecholate is reduced considerably or completely eliminated by the use of a small amount of sodium sulfite.

A series of tests was run on GR–S latex using antimonyl catecholate, its ammonia alcohol complex, antimonyl tert.-butyl catecholate, its ammonia alcohol complex, and antimonyl tt-octyl catecholate, with different salts including sodium sulfite. The process of the foregoing examples was used in preparing the complexes. Ethyl alcohol was used as the alcohol.

Table II shows the effect of the various added materials on discoloration and preflocculation after different aging periods.

TABLE II

| Antioxidant Added | Color | | After 7 Days | |
|---|---|---|---|---|
| | Initial | After 1 Hour | Color | Prefloc |
| 2% Antimonyl catecholate (as 33% dispersion) | White | Very light gray | Light gray | Very Heavy. |
| 2% Antimonyl catecholate plus 2% sodium sulfite | ----do---- | White | White | Heavy. |
| 2% Ammonia alcohol complex of antimonyl catecholate | Very light gray | Very light blue-gray | Light blue-gray | None. |
| 2% Ammonia alcohol complex of antimonyl catecholate plus 2% sodium sulfite. | White | White | White | Do. |
| 2% Antimonyl tert-butyl catecholate (as 16.6% dispersion) | Light cream | Light cream | Cream | Heavy. |
| 2% Antimonyl tert-butyl catecholate plus 2% sodium sulfite | White | White | White | Light. |
| 2% Ammonia-alcohol complex of antimonyl tert-butyl catecholate (in 50% alcohol). | Light yellow | Light yellow | Brownish yellow | Very light. |
| 2% Ammonia-alcohol complex of antimonyl tert-butyl catecholate plus 2% sodium sulfite. | ----do---- | ----do---- | Light yellow | Do. |
| 2% Antimonyl tt-octyl catecholate as 16.6% dispersion | White | White | Cream | Heavy. |
| 2% Antimonyl tt-octyl catecholate plus 2% sodium sulfite | ----do---- | ----do---- | White | Medium heavy. |

| Antioxidant Added | After 25 Days | | After 6½ Months | |
|---|---|---|---|---|
| | Color | Prefloc | Color | Prefloc |
| 2% Antimonyl catecholate (as 33% dispersion) | Blue-gray | Very heavy | Blue-gray | Very heavy. |
| 2% Antimonyl catecholate plus 2% sodium sulfite | White | Heavy | White | Heavy. |
| 2% Ammonia alcohol complex of antimonyl catecholate | Blue-gray | None | Light blue-gray | Very light. |
| 2% Ammonia alcohol complex of antimonyl catecholate plus 2% sodium sulfite. | White | ----do---- | Very light gray | Light. |
| 2% Antimonyl tert-butyl catecholate (as 16.6% dispersion) | Cream | Heavy | Tan | Very heavy. |
| 2% Antimonyl tert-butyl catecholate plus 2% sodium sulfite | White | Light | White | Medium. |
| 2% Ammonia-alcohol complex of antimonyl tert-butyl catecholate (in 50% alcohol). | Brownish yellow | Very light | Brownish yellow | Very light. |
| 2% Ammonia-alcohol complex of antimonyl tert-butyl catecholate plus 2% sodium sulfite. | Light yellow | ----do---- | Light brownish yellow. | Light. |
| 2% Antimonyl tt-octyl catecholate as 16.6% dispersion | Dark cream | Heavy | Dark cream | Heavy. |
| 2% Antimonyl tt-octyl catecholate plus 2% sodium sulfite | White | Medium heavy | Light cream | Do. |

Compared to the antimonyl catecholates alone, the combination with sodium sulfite gave better color on aging of the latex and also caused considerably less preflocculation. In the case of the amine-alcohol complexes of antimonyl catecholates, which do not cause any appreciable amount of preflocculation, the combinations with sodium sulfite were definitely better in color.

This application is a continuation-in-part of my application Serial No. 159,368 filed May 1, 1950, now abandoned.

The foregoing is illustrative of the invention, and the invention is not limited to the data disclosed.

What I claim is:

1. Latex of a rubber-like copolymer of a conjugated hydrocarbon diene monomer and an ethylenically unsaturated monomer, which contains a small amount of both (A) an antimonyl compound of the class consisting of (a) antimonyl 1,2-dihydroxy phenolates and naphtholates which are unsubstituted, (b) antimonyl 1,2-dihydroxy phenolates and naphtholates which contain in the 4-position an alkyl substituent of no more than eight carbon atoms, (c) antimonyl 1,2-dihydroxy phenolates and naphtholates which contain in the 4-position an aryl substituent of no more than eight carbon atoms, (d) antimonyl 1,2-dihydroxy phenolates and naphtholates which contain a halogen substituent in the 4-position, (e) antimonyl 4,6-dialkyl catecholates in which the alkyl substituents each contain no more than eight carbon atoms, (f) water-soluble amine-alcohol complexes of said antimonyl compounds obtained by heating to 80° C. an amine, an alcohol and one of said antimonyl compounds, said complexes each containing substantially one equivalent of amine nitrogen and one to two equivalents of alcohol for each equivalent of antimonyl compound, and (g) amine complexes of said antimonyl compounds and (B) a sulfite of the class consisting of the ammonium sulfites, alkali metal sulfites and the alkaline earth metal sulfites.

2. The latex of claim 1 in which the diene monomer from which the copolymer is obtained is butadiene-1,3.

3. The latex of claim 1 in which the unsaturated monomer is styrene.

4. The latex of claim 1 in which the copolymer is a copolymer of butadiene and styrene.

5. The latex of claim 1 in which the stabilizer is in part the compound, antimonyl catecholate.

6. The latex of claim 1 in which the stabilizer is in part the ammonia-alcohol complex of antimonyl catecholate.

7. The latex of claim 1 in which the stabilizer is in part sodium sulfite.

8. The latex of claim 1 in which the copolymer is a copolymer of butadiene and styrene and the stabilizer includes sodium sulfite and the compound, antimonyl catecholate.

9. The latex of claim 1 in which the copolymer is a copolymer of butadiene and styrene and the stabilizer includes the ammonia-alcohol complex of antimonyl catecholate and sodium sulfite.

10. The latex of claim 1 in which the stabilizer is in part the compound, antimonyl tert-butyl catecholate.

11. The latex of claim 1 in which the stabilizer is in part the ammonia-alcohol complex of antimonyl tert-butyl catecholate.

12. The latex of claim 1 in which the stabilizer is in part the compound, antimonyl tt-octyl catecholate.

No references cited.